United States Patent
Suasin et al.

(10) Patent No.: US 7,629,011 B2
(45) Date of Patent: Dec. 8, 2009

(54) PROCESS FOR REMOVING THE PEEL FROM CITRUS FRUIT

(75) Inventors: Jogre Suasin, Clayton, CA (US); Karim Nafisi, Walnut Creek, CA (US); Juan Lopez, Livermore, CA (US)

(73) Assignee: Del Monte Corporation, San Francisco, CA (US)

( * ) Notice: Subject to any disclaimer, the term of this patent is extended or adjusted under 35 U.S.C. 154(b) by 641 days.

(21) Appl. No.: 11/207,712

(22) Filed: Aug. 22, 2005

(65) Prior Publication Data

US 2007/0042096 A1   Feb. 22, 2007

(51) Int. Cl.
*A23L 1/216* (2006.01)
(52) U.S. Cl. .................. 426/482; 426/483; 426/481
(58) Field of Classification Search ............ 426/482, 426/483, 481
See application file for complete search history.

(56) References Cited

U.S. PATENT DOCUMENTS 6,592,736 B2  7/2003  Fulton et al.

2004/0043126 A1 *  3/2004  Grewal ................ 426/616

FOREIGN PATENT DOCUMENTS

JP   2005 080562 A   3/2005

OTHER PUBLICATIONS

Uribe et al., Measuring Solution Viscosity and its Effect on Enzyme Activity, Biol. Proceed. Online, May 1, 2003, vol. 5, No. 1, pp. 108-115.
International Search Report issued in PCT/US 06/32331, dated Oct. 30, 2007.

* cited by examiner

*Primary Examiner*—Anthony Weier
(74) *Attorney, Agent, or Firm*—Buchanan Ingersoll & Rooney PC

(57) ABSTRACT

An efficient process for enzymatically peeling citrus fruit applies a vacuum to perforated fruit and, while maintaining that vacuum, introduces an enzyme solution to the perforated fruit. The fruit is infused with the enzyme by releasing the vacuum pressure. After incubating the enzyme, the albedo of the fruit is weakened and the citrus peel can be readily removed. The peeled fruit may be divided into sections and the encompassing membrane removed.

29 Claims, 6 Drawing Sheets

PROCESS FOR REMOVING THE PEEL FROM CITRUS FRUIT

FIELD OF THE INVENTION

This invention concerns an efficient process for peeling citrus fruits. More particularly, the process uses an enzyme to weaken and/or dissolve the albedo between the citrus peel and the citrus fruit sections which it surrounds.

BACKGROUND

The process of this invention permits the efficient peeling of citrus fruits so that individual segments of the fruit can be readily prepared. As is well known, citrus fruit has an outer peel and inner fruit segments separated from one another by membranes that also surround each individual segment. Between the outer peel and the membranes surrounding the individual segments is a white, pithy material known as the albedo.

In the past, citrus peeling has been accomplished by hand peeling the skin and removing the albedo to expose the fruit segments. Typically, the skin peeling and albedo removal has been done with a knife, which leads to removal and loss of some of the fruit. Complete removal of the albedo, and its white color, from the fruit segments requires additional processing time and care.

Peeling methods using mechanical equipment of various types is also known to those in the business. Generally, however, such mechanical peeling processes leave the peeled fruit in a condition that still requires hand removal of some portion of the albedo.

Processes have also been proposed to use an enzyme, such as pectinase, to dissolve and/or weaken the albedo so that the skin can be removed from the segments of meat inside the citrus fruit. For example, U.S. Pat. Nos. 5,170,698 and 5,196,222 to Kirk concern a process and related apparatus to peel citrus fruit where the fruit is perforated, given an equatorial cut, and deposited in a canister. The canister is filled with an albedo degrading solution, such as an aqueous solution of commercial pectinase, or a mixture of enzyme solutions. The albedo degrading solution is vacuum infused into the fruit to substantially disintegrate the albedo of the fruit.

Another peeling process simply removes a strip of citrus outer peel substantially at the equator of the fruit. The fruit is immersed in an enzyme solution. Then, a vacuum is applied to remove air from the citrus fruit and released. See, for example, U.S. Pat. No. 5,989,615.

Another possible peeling process involves submerging fruit in a fluid followed by the application of a vacuum. The vacuum may be applied in one or two steps. Thereafter, the vacuum is released and pressure is applied to the fluid. The fluid may contain pectinase. See, U.S. Patent Publication US 2004/0043126.

It has been found, however, that those prior art methods do not function well when scaled to commercial operations.

SUMMARY

The process of the present invention prepares citrus fruits by preparing the fruit for processing by the steps of grading the fruit into substantially uniform size ranges or a mix of graded fruit and washing the fruit to remove surface debris, dirt, residues and naturally occurring waxes. A surface active agent may be used in the washing step. The clean, graded fruit is then subjected to a perforating process that creates a plurality of holes through the outer peel of the fruit and extending into the albedo inside the outer peel. The perforated fruit is then rinsed to remove any particle of the outer peel and albedo that may remain on the fruit.

After rinsing, the fruit is placed in a chamber. After the chamber is closed, a vacuum is applied to the inside of the chamber and the fruit contained therein. After a predetermined period of time that allows the pressure inside the fruit to equilibrate with the vacuum, an enzyme effective to degrade the albedo is introduced into the vacuum chamber. Sufficient enzyme is introduced to cover all the fruit contained in the vacuum chamber.

After the enzyme has been introduced, the vacuum is released and the chamber pressure is vented to atmospheric pressure. The fruit may then be subjected to heat and undergoes an incubation process. Heat accelerates the enzyme activity. The enzyme then attacks and breaks-down the albedo of the fruit pieces. Following incubation, the fruit is cooled, then peeled, and the enzyme is deactivated.

Subsequently, the fruit is rinsed, the outer peel is removed, and the individual segments are prepared for further processing.

Further details of these, as well as other, steps are discussed in the detailed description which follows.

BRIEF DESCRIPTION OF THE DRAWINGS

Many objects and advantages of the present invention will be apparent to those skilled in the art when this description is read in conjunction with the appended drawings wherein like reference numerals are applied to like elements and wherein.

DETAILED DESCRIPTION OF THE INVENTION

In commercial processing of citrus fruit to obtain citrus fruit segments, large quantities of freshly harvested citrus fruit are provided to the process. The process of this invention is suitable for use with citrus fruits including, for example, grapefruit, oranges, lemons, and limes. Depending upon the particular citrus fruit to be processed, certain features of the apparatus may require modification, some of which will be discussed below.

Figure 1:
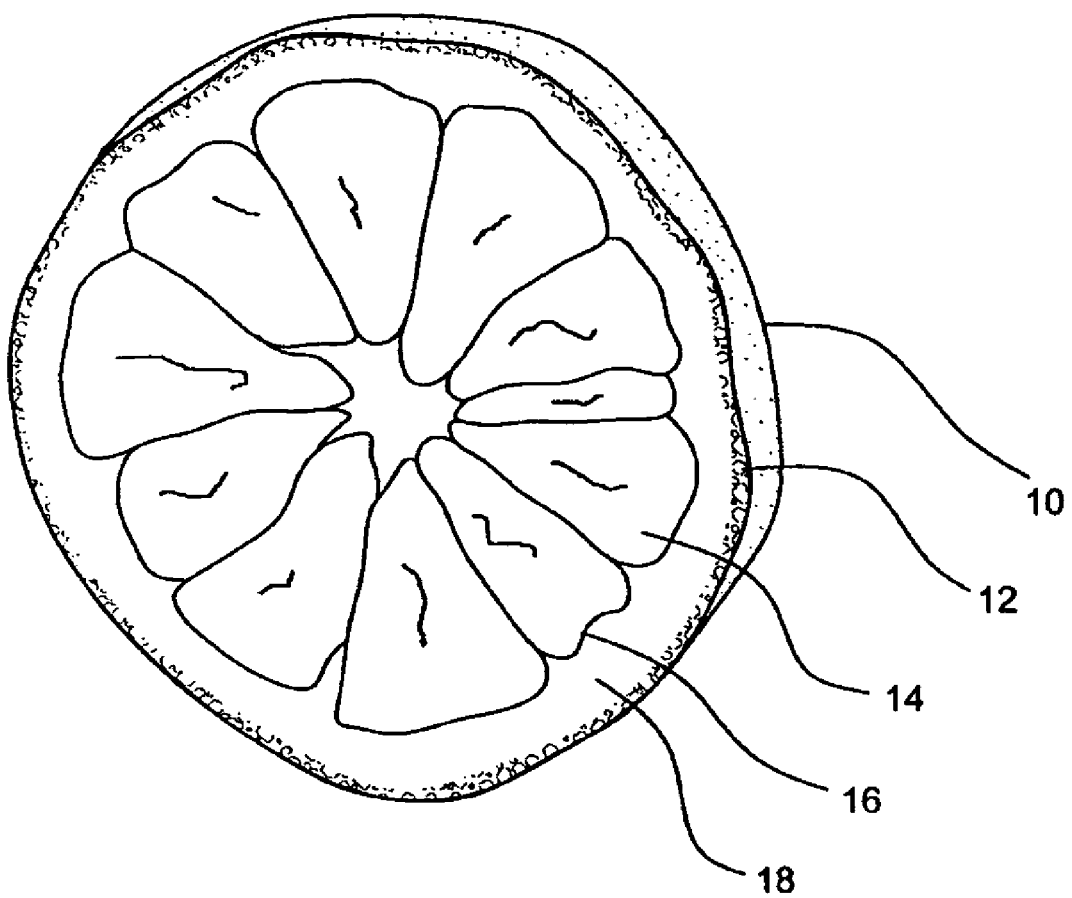
FIG. 1 is a schematic illustration of a citrus fruit.

Some characteristics of citrus fruit, grapefruit in particular, are helpful background for this invention. FIG. 1 shows, for example, a grapefruit 10 which has been cut transversely to show its internal structure. The outside of the grapefruit is a tough, waxy outer peel 12 that contains cells with grapefruit essential oils. Toward the center, the grapefruit 10 includes a plurality of fruit sections 14, each of which is surrounded by a membrane 16. Between that membrane 16 and the outer peel 12 is a pithy white layer 18, also known as the albedo.

The first step in the process involves an initial inspection of the exterior of freshly harvested fruit 10. That inspection step involves determining whether the individual fruits are suitable for the process. To that end, the pieces of fruit are examined to determine such qualities as firmness, cleanliness, and rotted condition. Rotted fruit is rejected and discarded or used in byproduct process streams. Soft fruit is likewise rejected, but may be used in other byproduct process streams including, for example, juice extraction. Fruit which is excessively dirty is pre-washed to an acceptable level for handling in the process. For quality analysis purposes, a sample of fruit from each truckload is examined and a record is made of the percentage portions which are too dirty, rotten, or too mushy.

Figure 2:
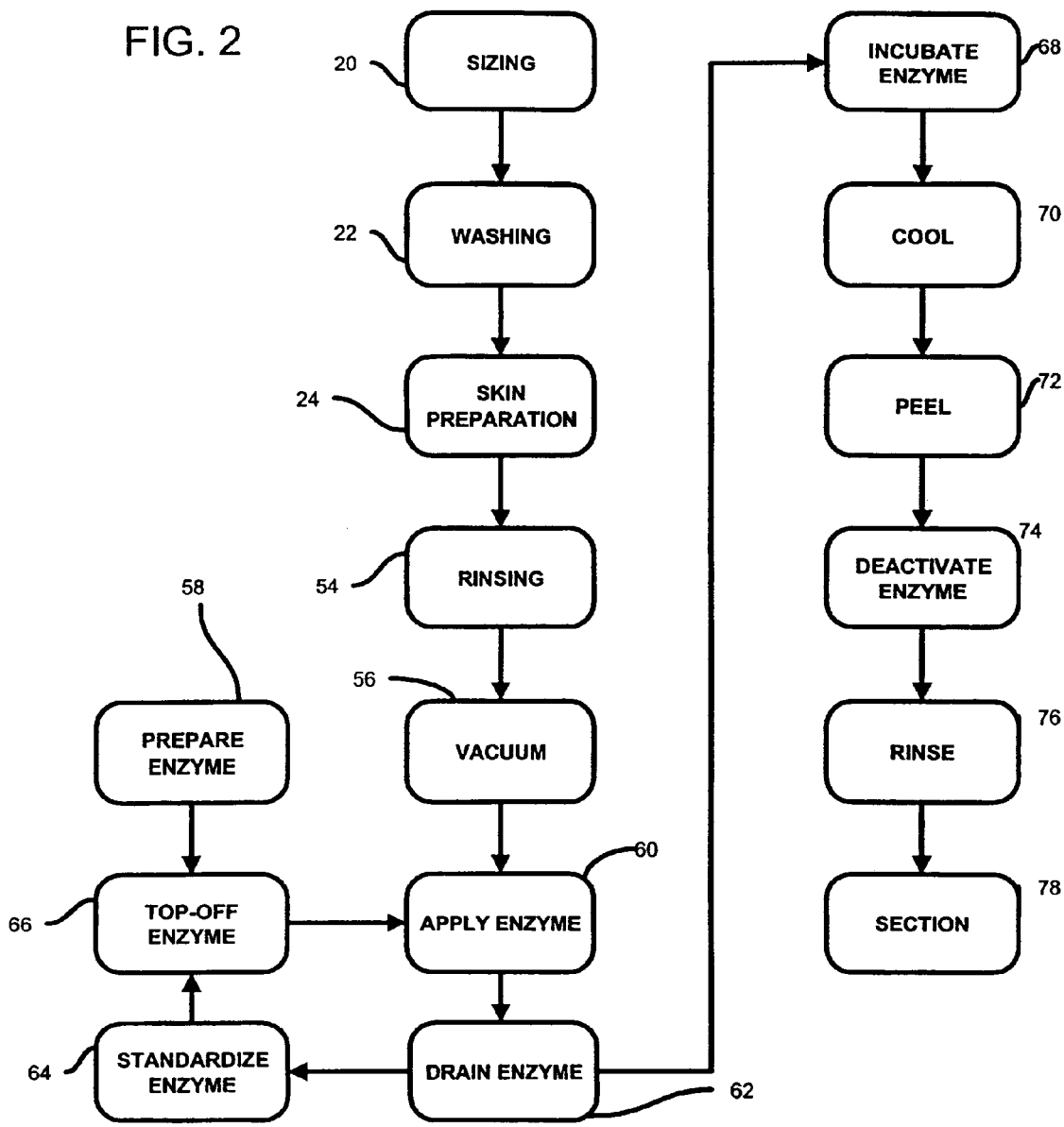
FIG. 2 is a schematic diagram of process steps according to this disclosure.

With reference to FIG. 2, the next step involves sizing 20 the fruit so that the pieces of fruit satisfy minimum size criteria. For example, grapefruit are preferably sized so that the minimum-diameter is about 3.25 inches, while oranges are preferably sized so that the minimum diameter is about 2.875 inches. These preferred sizes are selected, in part, so that the resulting fruit segments have appropriate size for commercial sale. These preferred minimum diameters may, of course, be selected to have different values depending on the processing equipment to be used; however, the preferred values expressed are believed to be workable sizes for commercial operations. Other kinds of citrus fruit that are typically smaller than oranges and grapefruit, namely lemons or limes, would be expected to have different, smaller preferred diameters. Fruit which fails to meet the minimum preferred diameter criterion is rejected for the process and passed to other by product streams, such as, for example, juice extraction. Fruit that successfully passes the sizing operation is temporarily stored in bins that may be fashioned from a suitable conventional plastic material.

Next, the bins with appropriately sized fruit are dumped into the processing line which a washing step 22 is performed. Washing is accomplished by advancing the fruit by a suitable conveyor that moves the fruit through suitable washing apparatus that includes rotating brushes that effectively scrub the outer surface of the pieces of fruit. As the fruit progresses through the washing apparatus water is sprayed on the fruit surface to aid the scrubbing operation. In addition, the fruit is sprayed with a suitable surface active agent, e.g., an alkaline detergent having a concentration of about 14,000 ppm, to further enhance the scrubbing operation. The scrubbed fruit is then immersed in a weak peracetic acid solution for sanitizing purposes. For example, the peracetic acid with a concentration of 70 ppm may be advantageously used.

After sanitization, the fruit is subjected to a skin preparation step 24. In this skin preparation step, the outer peel of the grapefruit is treated to enhance access to the albedo by an enzyme solution to be applied later. This skin preparation step may involve, for example, abrasion of the outer peel or perforation of the outer peel. Other techniques may also be apparent to those skilled in the art. Nevertheless, the skin preparation step 24 at least partially removes some of the outer peel so that access is provided to the albedo at multiple locations on the fruit. With the abrasion technique, the outer peel is scuffed to roughen it and expose parts of the albedo randomly distributed about the surface of the fruit.

The currently preferred skin preparation technique, however involves perforation where the outer peel of each fruit is mechanically penetrated to produce a plurality of holes. For oranges and grapefruit, mechanical perforation using pins having a length of about 0.1875 inches, and a diameter of about 0.0276 inches (about 0.7 mm) has been found to be successful. The mechanical perforation step is intended to provide perforations randomly distributed over at least about 75% of the surface of each piece of fruit. Preferably, the perforations are randomly distributed over substantially the entire surface of each piece of fruit.

Figure 3:
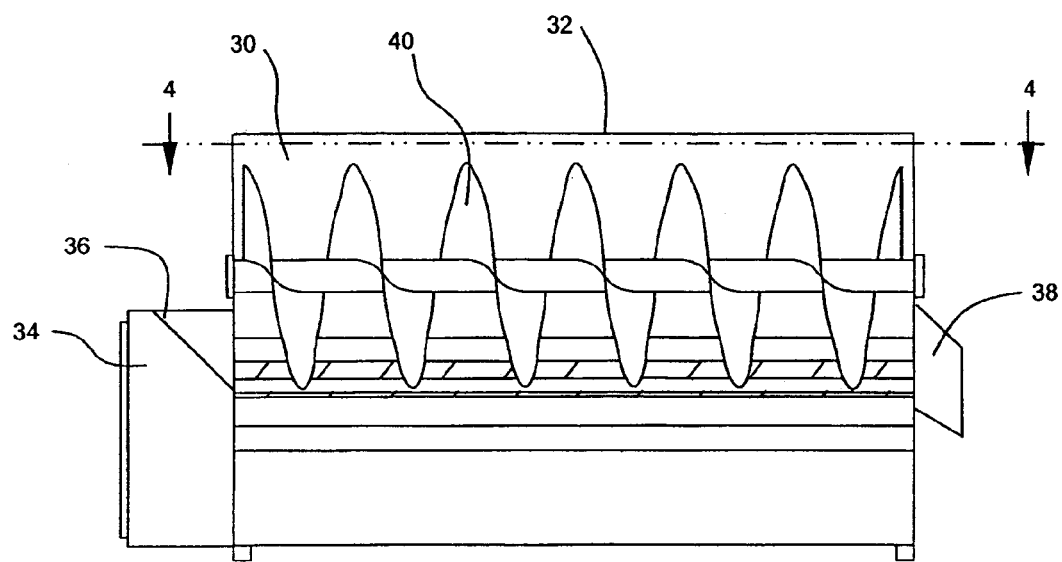
FIG. 3 is a front view in partial cross section of a fruit perforating unit of this disclosure.

Mechanical perforation can be accomplished, for example, using a perforator assembly 30 (see FIG. 3) which includes a housing 32 having a pair of ends. One end has an inlet opening sized to simultaneously receive multiple pieces of fruit and an inlet housing 34 that includes an inlet ramp 36 for delivering fruit to the inlet opening. The second end of the perforator assembly 30 has a discharge opening that delivers perforated fruit to a discharge chute 38.

The perforator assembly 30 also includes an internal screw conveyor 40 that is rotatable about its longitudinal axis. The conveyor 40 includes a generally helical surface extending generally radially outwardly from the axis. The helical surface makes a plurality of revolutions about its axis between the ends of the housing 32, for example six full revolution of the helical surface may be provided. The pitch of the helical surface for each revolution is selected so that at least one piece of fruit can be received between axially adjacent parts of the helical surface, although the pitch may be sufficient to accommodate a plurality of pieces of fruit between such axially adjacent parts of the helical surface. To drive the screw conveyor 40, a suitable conventional motor (not shown) may be provided at one end of the conveyor 40. When the screw conveyor 40 rotates, it mechanically advances fruit from the inlet opening at the first end to the discharge opening at the second end.

Figure 4:
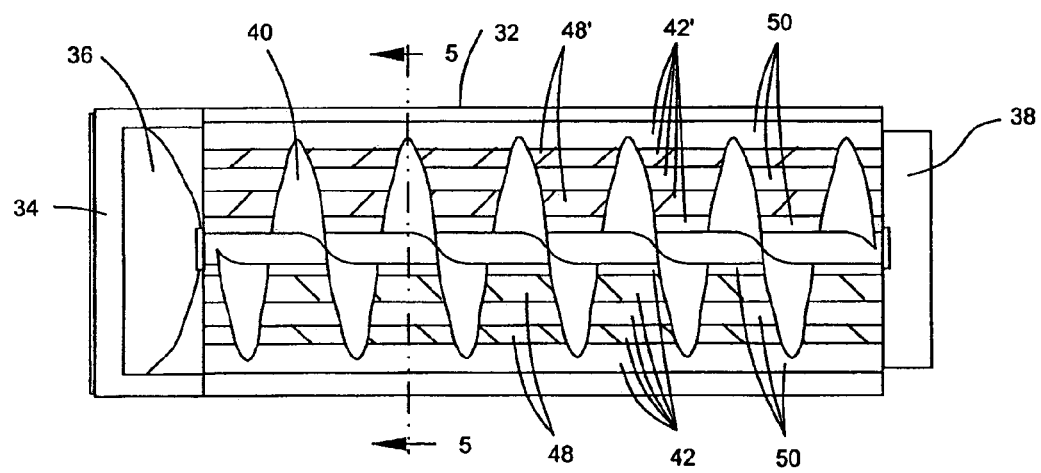
FIG. 4 is a partial cross-sectional view taken along the line 4-4 of FIG. 3.
Figure 5:
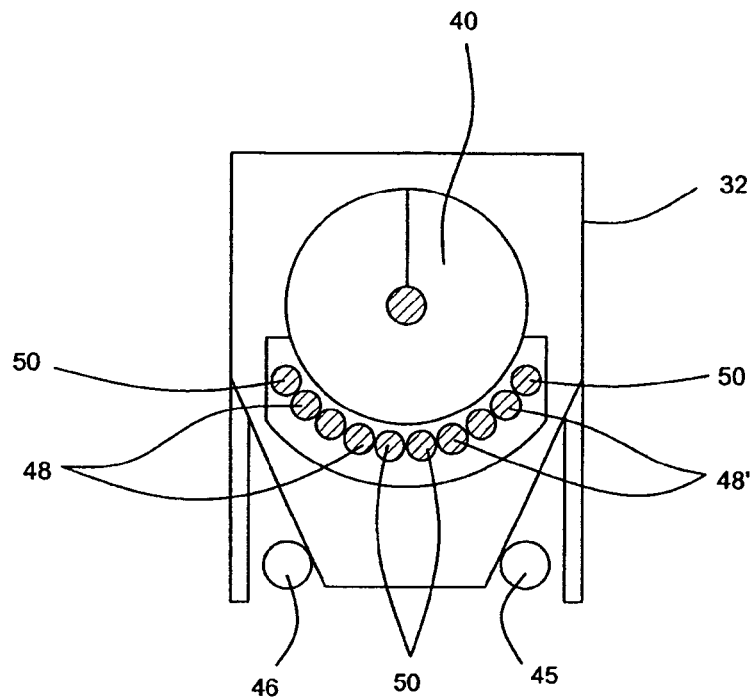
FIG. 5 is a partial cross-sectional view taken along the line 5-5 of FIG. 4.

A plurality of parallel, generally cylindrical, elongated rollers 42, 42' (see FIG. 4) support the fruit as it moves through the perforator assembly 30. By way of example, as many as ten such rollers may be used. Preferably, the rollers 42, 42' are uniformly spaced from one another along an arc (see FIG. 5) that is centered on the axis of the screw conveyor 40. In this manner the minimum spacing between the edge of the screw conveyor 40 and the roller is substantially the same for each roller 42, 42'. Each roller 42, 42' is rotatably mounted in the perforator assembly 30 so as to be rotatable about its longitudinal axis. Suitable conventional motors 44, 46 are provided to rotate the rollers 42, 42' and are drivingly connected to the rollers 42, 42' with a conventional drive mechanism. The motor 44 drives the rollers 42, while the motor 46 drives the roller 42" on the other side of the perforator assembly 30.

Figure 6:
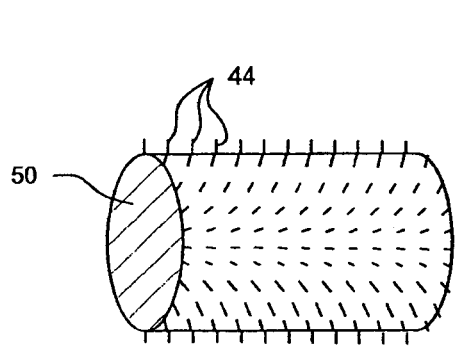
FIG. 6 is an enlarged, partial view of a perforation roller used in the fruit perforating unit.

The rollers 42, 42' preferably comprise a plurality of pin rollers 50 with a swing roller 48 disposed between pairs of pin rollers 50. As best seen in FIG. 6, the surface of each pin roller 42 includes a multiplicity of perforator pins 44. These pins 44 may be arranged in longitudinal rows, as shown, or in any other desired pattern. The pins 44 are sized to provide the desired perforations for the fruit being processed. The pins 44 may be cylindrical or non-cylindrical and may include a blunt wire tip. When processing grapefruit and/or oranges, pins having a diameter of about 0.0275 inches (0.7 mm) and a length of about 0.1875 inches have been found to be suitable. Moreover, the pins 44 are spaced from one another so that the weight of the fruit will cause the fruit to be impaled by the pins but the pins are not so closely spaced that the fruit is supported by so many pins 44 that the fruit is not effectively impaled.

Figure 7:
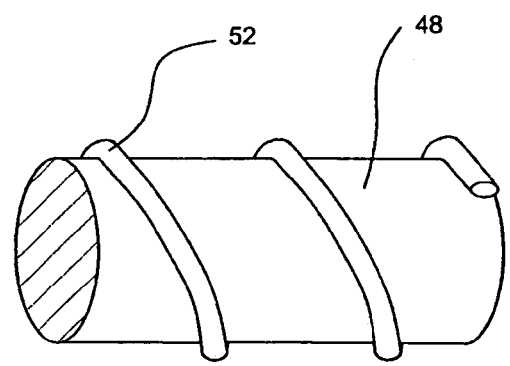
FIG. 7 is an enlarged, partial view of a swing roller used in the fruit perforating unit.

Each swing roller 58 (see FIG. 7) includes a generally helical surface element 52 that extends along substantially its entire length. The helical surface element 52 may be a surface attachment as shown, or may be a groove (not shown), or a combination of both. As the swing roller 58 rotates, the helical surface element 52 tends to push the pieces of fruit laterally with respect to the axis of the screw conveyor 40. To accomplish this action where the screw conveyor 40 rotates in a counterclockwise direction (looking downstream from the inlet 36), the swing rollers 48 (see FIG. 4) on the right side rotate clockwise and have a right-handed helical surface element 52. Conversely, the swing rollers 48' on the left side rotate counterclockwise and have a left-handed helical surface element 52'.

As the fruit enters the perforator assembly 30 (see FIG. 3) from the inlet opening, the screw conveyor 40 advances the individual pieces of fruit toward the discharge chute 38. Although the precise interaction between the rollers 42, 42', the screw conveyor 40, and the individual pieces of fruit is not fully understood and characterized, the swing rollers 48' and associated pin rollers 50 on the left side tends to push fruit laterally to the left of the screw conveyor axis, while the swing rollers 48 and associated pin rollers 50 on the right side tends to push fruit laterally to the right of the screw conveyor axis. Interaction between the screw conveyor 40 and the fruit tends to rotate the fruit about an axis extending substantially radially from the axis of the screw conveyor 40. The pins 44 of the rollers 50 puncture the outer peel of the fruit as the rollers themselves rotate. That rotation of the rollers 50 tends to cause the fruit to also rotate about a second axis substantially parallel to the axis of the rollers 50 and the axis of the screw conveyor 40. Action of the helical surface elements of the swing roller 48, 48' tends to cause the fruit to rotate about a third axis substantially perpendicular to the axis of the screw conveyor 40. Accordingly, as the fruit moves through the perforator assembly 30, it is subjected to rotation about multiple axes so that virtually the entire surface of the fruit is exposed to the pins 44 and perforated by them.

Fruit discharged from the discharge chute 38 of the perforator assembly 30 may be collected in, for example, a container such as a large, reusable basket. Moreover, the fruit discharged from the perforator assembly 30 is periodically inspected to determine what portion of the fruit surface has been effectively perforated. If about 75% or less of the surface is effectively perforated, the volume of fruit fed to the inlet of the perforator assembly 30 is reduced. Moreover, at a predetermined time interval, for example once about every 30 minutes, a piece of fruit is subjected to vacuum, and then submerged in colored water. Based on the resulting coloring of the outer peel, the uniformity of the perforation step can be assessed and recorded for process control purposes.

After the perforation step is completed (FIG. 2) the fruit is rinsed 54 to remove any particles of citrus peel that may adhere to the surface of the fruit.

Next, the containers of fruit are deposited in a vacuum chamber. The vacuum chamber used for this process is large, and may have dimensions of about ten feet in length, about four feet in width, and a depth of about four feet. The depth, if desired, may also be as great as about ten feet; however, the depth must be selected such that the bottom-most fruit in the chamber are not crushed by the weight of fruit above it in the chamber. To provide substantially continuous movement of fruit through the process, a pair of vacuum chambers may be used. In such an arrangement, fruit can be loaded into an open vacuum chamber while operations proceed in the second vacuum chamber. Then, when operations in the second vacuum chamber are finished, the first vacuum chamber can be closed and vacuum operation proceed therein while the second vacuum chamber is emptied and loaded with fruit.

With the fruit in the vacuum chamber and the chamber closed, a vacuum 56 is applied to the interior of the vacuum chamber. The vacuum in the chamber preferably likes in the range of about 1 to about 29 inches of mercury (in. Hg), and most preferably is about 27 in. Hg. This vacuum level is maintained in the vacuum chamber for an initial period of about 1 second to about 2 hours, and preferably for about 7 minutes. The precise amount of time for the vacuum step depends upon the amount of fruit which must be processed and the level of vacuum desired. For example, if fruit must be processed substantially continuously, a short time at a high vacuum may be appropriate; whereas, a small occasional operation may proceed in occasional batches so a long time at a lower vacuum may be acceptable.

Separately from the movement of fruit, an enzyme solution is prepared 58. The enzyme solution includes pectinase and water, with the pectinase concentration preferably being in the range of about 0.01% to about 40.00%. The percentages are weight percentages. The particular percentage used will depend upon the particular enzyme being used. Among the preferred enzymes for this process are Novozyme (Novoshape KE 545005) from Novo and Crystalzyme PML-MX from Valley Research. A concentration of about 0.15% is suitable for those preferred enzymes. When prepared, the temperature of the enzyme solution is preferably maintained in the range above freezing to less than the denaturing temperature of the enzyme, preferably in the range of greater than 32° F. to about 130° F., and most preferably about 70° F. The particular temperature selected from this temperature range is also picked so as to be below the deactivation (denaturation) temperature for the enzyme.

With the enzyme solution prepared 58 and fruit in the vacuum chamber under a vacuum condition, the enzyme solution is transferred 60 into the vacuum chamber while the vacuum is maintained. For example, this transfer 60 into the vacuum chamber may be accomplished by appropriate valves which allow the enzyme solution to enter the vacuum chamber from the bottom. The enzyme solution is applied to the vacuum chamber until all the fruit in the chamber is covered by the solution. By covering the fruit with a perforated lid when the fruit is loaded into the vacuum chamber, any tendency of the fruit to float above the enzyme solution is substantially avoided. This transfer step 60 preferably takes place over a time period of about 1 to about 120 minutes preferably about 1 to about 10 minutes, and most preferably about 3 minutes.

Generally speaking, the known processes for enzymatic treatment of citrus fruit involve batch processing at least at the process point where enzymatic treatment occurs. When earlier processes for enzymatic treatment of citrus fruit have been scaled from laboratory-scale to commercial scale, the process performance has not been uniform as to the various pieces of fruit in each batch. On a commercial level, the enzymatic treatment can occur in tanks that are, for example, 10 feet long by 4 feet wide and 4 to 10 feet deep. While the exact reasons for such lack of uniform processing are not fully known, deep tanks filled with enzymatically active liquid have a hydrostatic pressure gradient that increases from the top of the tank to the bottom of the tank. That hydrostatic pressure gradient opposes any vacuum that may be applied to the head space at the top of the tank and appears to counteract the effect of the vacuum on the perforated fruit. In addition to that hydrostatic effect, surface tension resistance to formation of air bubbles escaping from perforations, as well as resistance air flow through the long channel formed by the perforation step, resist release of gas from inside the fruit when bathed in liquid.

The sequence of steps in applying the enzyme to the perforated fruit is believed to be very important. While the precise mechanisms are not yet fully understood, it appears that applying the vacuum to the perforated fruit prior to submerging fruit in the enzyme solution allows any air and/or other gas inside the fruit to be substantially uniformly and consistently vented to the vacuum chamber with minimal resistance and to facilitate enzyme penetration. Moreover, any hydrostatic effects and surface tension effects are effectively eliminated because no gas/liquid interface exists during the vacuum process. Rather, the prolonged vacuum in the chamber outside the fruit establishes a pressure differential so that air and or gas inside the fruit vents to the lower pressure of the vacuum chamber until the pressure inside the fruit essentially equilibrates with the vacuum pressure outside the fruit.

The vacuum in the chamber is then released. Upon release of the vacuum, the enzyme solution enters the perforations in the outer peel of the fruit and, thus, has access to the albedo of the fruit. About 30% of the enzyme solution in the chamber is absorbed by or infused into the perforated fruit. That portion of the enzyme solution that is not absorbed by the fruit is drained 62 from the vacuum chamber for use in a subsequent batch of fruit. Before the enzyme solution drained from the vacuum tank is used for another batch of fruit, however, several additional steps occur. Periodically, the drained enzyme is analyzed so that the enzyme concentration can be standardized 64. That standardization process may occur as frequently as once for each batch of fruit; but, the standardization process may occur less frequently, such as once for every two to four batches. Based on the standardization process, substantially pure enzyme additions may be made to replenish the enzyme solution and return its enzyme concentration to the target concentration. The technique for this standardization process is an important part of this invention and is discussed separately below.

After each application of enzyme solution 60 to the vacuum chamber, the enzyme solution drained from a previous batch is topped-up or topped-off 66 to replace enzyme absorbed by the previous batch. To top-off 66, fresh enzyme solution at the target enzyme concentration is used, e.g., at 0.15% concentration using the most preferred enzyme concentration discussed above.

The enzymatically treated fruit is then placed in an incubation bath 62 for an incubation period ranging from about 5 to about 120 minutes, preferably from about 15 to about 60 minutes, and most preferably about 45 minutes. The incubation bath preferably is water (but it may include enzyme) at a temperature in the range from about freezing to less than the denaturing temperature for the enzyme being used, preferably in the range of greater than about 32° F. to about 155° F., more preferably in the range of about 100° F. to about 150° F., and most preferably about 122° F. (50° C.). The temperature may preferably be selected in those ranges such that the enzyme has maximum activity per unit substrate. During the incubation period, the enzyme attacks the albedo between the fruit outer peel and the albedo from the membrane surrounding the fruit, substantially destroys the albedo thereby loosening the outer peel from the membrane surrounding the fruit, and substantially avoiding a subsequent need for further removal of the albedo.

After the incubation step 62, the fruit is cooled 64. Cooling can be effected by allowing the fruit to equilibrate with room temperature. Alternatively, cooling can be accomplished by immersing the fruit in cold water for a time sufficient to reduce the external temperature of the fruit to a level where it can be handled.

With the fruit cooled, it is peeled 66. That peeling step can be done by hand or mechanically, although it is preferred that hand peeling be used. During the hand peeling step, any residual albedo can be scraped from the membrane covered segments.

After the fruit has been peeled, the enzyme is deactivated 68. Deactivation of the enzyme is effected by placing the fruit in a water bath or otherwise heating it to a temperature at or above the denaturing temperature. Suitable deactivation temperature lies in the range of about 100° F. to about 280° F., more preferably in the range of 170° F. to about 200° F., and most preferably about 194° F. (90° C.) for a deactivation time in the range of about 1 second to about 3 hours, most preferably about 15 seconds. Deactivation techniques other than heating may also be used. For example, enzyme deactivation may be accomplished using an unfavorable environment, such as an acidic environment, a basic environment, or a pressure environment. Yet another enzyme deactivation technique may be a chemical deactivation.

After enzyme deactivation, the peeled fruit is rinsed 70, and the fruit is then separated into segments 72. If desired, the membrane surrounding the fruit segments may be removed so that only the meat of the citrus sections remains.

The process of this invention generates high quality, substantially uniform, and consistent enzymatically peeled citrus fruit segments and/or sections that can be further packaged for retail sale and consumption. Moreover, the process allows commercial scale use of enzyme peeling of citrus fruit.

As noted above, the foregoing process may be used for high throughputs of fruit such that the process is substantially continuous even though steps such as the vacuum chamber operation take place batchwise. Where the vacuum treatment step 56 occurs for short time intervals, e.g., under 30 minutes, the enzyme standardization step 64 must be accomplished rapidly. Past experience with techniques for determination of enzyme concentration and activity indicate that special reagents and as much as a day may be required to accurately evaluate enzyme concentration, particularly when the enzyme concentration is quite small. Such time periods are impractical if the enzyme concentration must be evaluated in a time frame measured in minutes.

Figure 8:
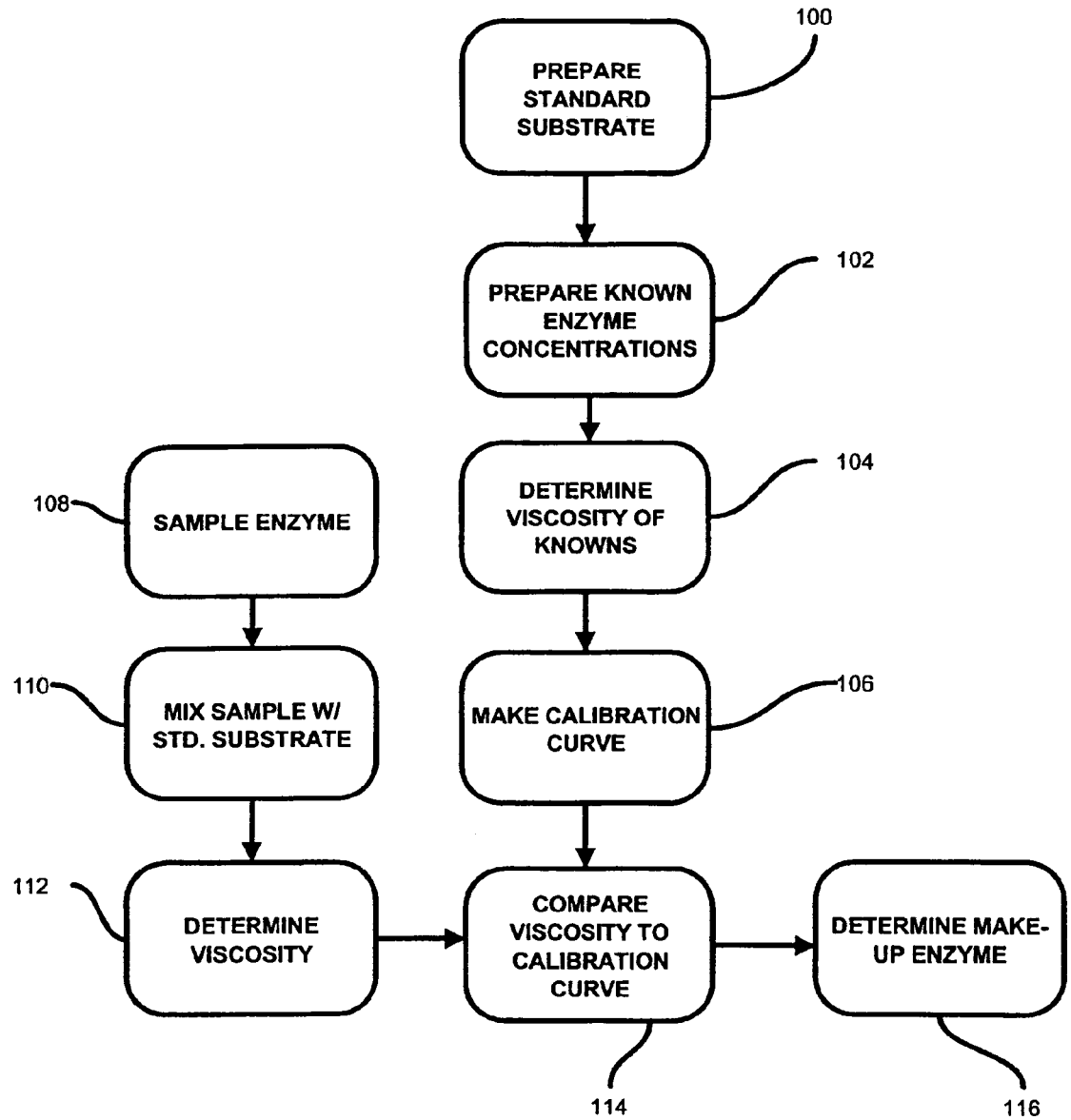
FIG. 8 is a schematic diagram of the enzyme standardization process of this disclosure.

A procedure that allows enzyme standardization in a time frame measured in minutes begins by preparing a standard substrate 100 (see FIG. 8) of the material on which the enzyme acts. For example, when using a pectinase, a standard substrate may be prepared by dispersing 2-10% pectin mixture in distilled water along with a preservative and sufficient acid to activate the preservative without having a significant affect on pH of the solution. The quantity of pectin mixture used is selected such that the amount of pectin will exceed the amount of pectin that would be destroyed by the enzyme used. The pectin mixture may preferably comprise 50% low methoxy pectin and 50% high methoxy pectin. The preservative may, for example comprise 50% sodium benzoate and 50% potassium sorbate. With that preservative, citric acid may be used. That substrate solution is boiled to completely hydrate the pectin. The thickened substrate solution is then cooled and may be stored at ambient temperature. When cooled, the substrate can be stored as long as six months.

A series of enzyme solutions each having a known enzyme concentration 102 is then prepared. The known concentrations range from 0% at the lower end to a value exceeding the nominal enzyme concentration, i.e. bracketing the nominal enzyme concentration. For the most preferred example discussed herein, the nominal or target enzyme concentration is 0.15%, so a concentration range from 0% to 0.20% in increments of 0.01% may be used.

Each of the known enzyme solutions is then mixed with a standard volume of the standard substrate. For example, 20 ml of each solution may be mixed with 330 g. of the standard substrate. Viscosity is then measured 104 for each mixture of a known enzyme solution with the standard substrate. Viscosity may be measured, for example, using a Brookfield LRV viscometer with a #2 Spindle operating at a speed of 60 rpm, and taking the measurement after 5 minutes.

Figure 9:
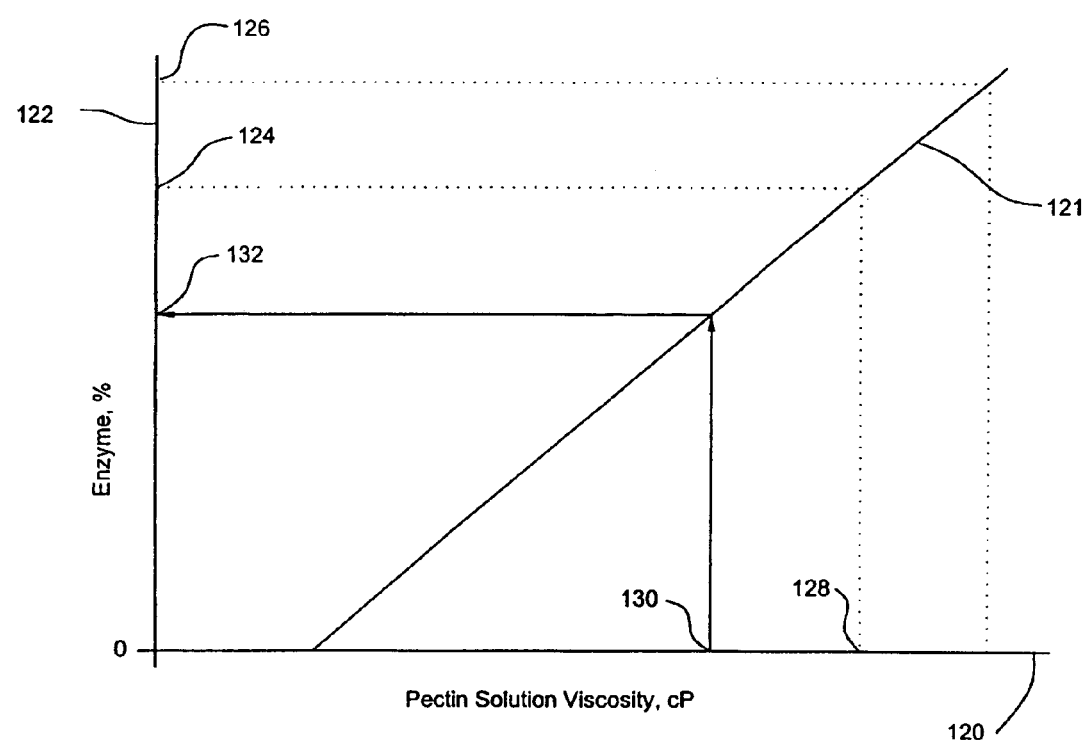
FIG. 9 is a chart of a calibration curve.

Viscosities for the known enzyme concentrations may then be plotted to create a calibration curve 106. An example of a calibration curve is shown in FIG. 9, where the abscissa 120 is the viscosity and the ordinate 122 is the enzyme concentration. The data points of the calibration curve may be statistically analyzed to provide the best curve fit. The nominal or target enzyme concentration 124 is less than the highest standard enzyme concentration 126 so that the range of known concentrations (and the associated viscosities) will bracket the nominal enzyme concentration 124 and its nominal viscosity 128. It will be noted from FIG. 9 that the calibration curve is linear for low concentrations. At higher concentrations, the calibration curve may be nonlinear.

To evaluate the enzyme concentration of the solution drained from the vacuum chamber 64 (see FIG. 2), a sample of the solution 108 (see FIG. 8) is taken, e.g., 20 ml. That sample is then mixed 110 with a standard amount (e.g., 330 g.) of the standard substrate. Using the same Brookfield viscometer with the same spindle and speed, viscosity of the enzyme sample is determined 112, again after 5 minutes. To be sure that the measured viscosity of the unknown sample is accurate, a 20 ml sample of distilled water may also be mixed with the standard amount of the standard substrate and be subjected to the same viscosity determination. That viscosity sample using distilled water will determine whether any adjustment of the measured viscosity for the unknown sample needs to be made.

The measured viscosity for the unknown sample is compared 114 to the calibration curve (FIG. 9) to determine its enzyme concentration. For example, knowing the viscosity 130 of the unknown sample, the calibration curve graphically provides the corresponding enzyme concentration 132 Knowing the enzyme concentration of the sample, the quantity of pure enzyme required to raise the level of enzyme concentration to the nominal level can be determined 116. in any of several ways. For example, a table can be conveniently prepared to specify the amount of enzyme required for a convenient quantity, e.g., 1000 pounds of solution, as a function of the measured enzyme concentration in the sample. Alternatively, a graphical correlation between enzyme concentration and required pure enzyme could be used. Other techniques, including without limitation use of a programmable computer using commercially available programs, can also be used to determine the required pure enzyme. Moreover, a programmable computer using commercially available programs could also be used to house the calibration data, determine the best curve fit, evaluate the unknown enzyme concentration based on its viscosity, and determine the amount of pure enzyme required for either (i) a predetermined unit of enzyme solution (e.g., 1000 pounds) or (ii) the actual weight of enzyme solution drained from the vacuum chamber.

Regardless of the specific technique used to determine the required amount of pure enzyme, by adding the thus determined quantity of pure enzyme to the drained solution, the solution is fortified and its enzyme concentration is returned to the nominal concentration. Any additional volume required to fill the vacuum chamber can then be provided using fresh, nominal enzyme concentration solution.

This procedure allows the enzyme concentration of the drained liquid to be evaluated in minutes, rather than hours. Moreover, the procedure is well suited to rapid batch type processes such as the use of alternating vacuum chambers as described above.

This enzyme treatment process also digests the outer peel's cell walls and facilitates the release of grapefruit oil. For sufficiently large volumes of fruit throughput, the waste, i.e., outer peel and albedo, may be further processed to produce essential citrus oil.

Using the process described above, a batch of enzyme solution can be recycled, replenished with additional fresh solution, and fortified with pure enzyme to maintain its nominal standard concentration level. Moreover, the standardization process described permits the same enzyme solution to be used as many as 10 to 20 consecutive times before being discarded. Filtration of the drained enzyme solution is an enhancement that may further increase the useful life of a batch of enzyme solution.

A further enhancement of the process is the addition of a surfactant to enhance the enzyme performance. The surfactant is a surface active agent, such as a food-grade detergent, which lowers surface tension in the enzyme solution and makes the cells more recipient to the enzyme.

Throughout this specification certain numerical values have been identified and introduced by the word "about", "essentially", and the like. Those numerical values are not intended to be limited to the precise values stated, but are intended to include variations within 5% above and/or below the specific figure used, as the context may suggest.

It will now be apparent to those skilled in the art that a new, useful, nonobvious process for peeling citrus fruit has been disclosed. Moreover, it will be apparent to those skilled in the art that numerous modifications, variations, substitutions and equivalents exist for features of the invention that do not materially depart from the spirit and scope of the invention, as defined by the appended claims. Accordingly, it is expressly intended that all such modifications, variations, substitutions, and equivalents which fall within the spirit and scope of the appended claims be embraced thereby.

What is claimed is:

1. A process for removing the peel from citrus fruit having a peel, fruit segments inside the peel, and albedo between the peel and the fruit segments, comprising the steps of:
    preparing the peel of the fruit in a plurality of locations to establish access to the albedo without penetrating fruit segments;
    applying a vacuum to the prepared citrus fruit to remove gas from the fruit;
    while maintaining the vacuum, applying an enzyme solution to the prepared citrus fruit;
    releasing the vacuum so that the prepared citrus fruit is infused with the enzyme solution;
    incubating the infused citrus fruit so that the enzyme solution deteriorates the albedo; and
    removing the peel from the citrus fruit.

2. The process for removing the peel from citrus fruit of claim 1, wherein the citrus fruit is selected from the group consisting of grapefruit, orange, lemon and lime.

3. The process for removing the peel from citrus fruit of claim 2, wherein the citrus fruit is grapefruit.

4. The process for removing the peel from citrus fruit of claim 2, wherein the citrus fruit is oranges.

5. The process for removing peel from citrus fruit of claim 1, wherein the skin preparation step involves abrading the peel.

6. The process for removing peel from citrus fruit of claim 1, wherein the skin preparation step involves perforating the peel.

7. The process for removing the peel from citrus fruit of claim 1, wherein the vacuum application step includes exposing the fruit to a vacuum pressure in the range of about 1 in. Hg. to about 29 in. Hg.

8. The process for removing the peel from citrus fruit of claim 7, wherein the vacuum pressure is about 27 in. Hg.

9. The process for removing the peel from citrus fruit of claim 1, wherein the vacuum is applied for a time period in the range of about 1 second to about 2 hours.

10. The process for removing the peel from citrus fruit of claim 9, wherein the vacuum is applied for a time period of about 7 minutes.

11. The process for removing the peel from citrus fruit of claim 1, wherein the enzyme solution is introduced in a time period ranging from about 1 to about 120 minutes.

12. The process for removing the peel from citrus fruit of claim 11, wherein the enzyme solution is introduced in a time period ranging from about 1 to about 10 minutes.

13. The process for removing the peel from citrus fruit of claim 11, wherein the enzyme solution in introduced in a time period of about 3 minutes.

14. The process for removing the peel from citrus fruit of claim 1, wherein the enzyme solution comprises water and the enzyme, and the enzyme has a concentration, by weight, in the range of about 0.01% to about 40.00%.

15. The process for removing the peel from citrus fruit of claim 1, wherein the enzyme solution comprises water and the enzyme, where the enzyme has a concentration of about 0.15% by weight.

16. The process for removing the peel from citrus fruit of claim 1, wherein the enzyme has a denaturing temperature, and the incubation step occurs at a temperature exceeding freezing and less than the denaturing temperature of the enzyme.

17. The process for removing the peel from citrus fruit of claim 16, wherein the temperature of the incubation step is selected such that the enzyme activity is within about 5% of its maximum activity per unit of substrate.

18. The process for removing the peel from citrus fruit of claim 17, wherein the incubation step occurs at a temperature in the range of about 32° F. to about 155° F.

19. The process for removing the peel from citrus fruit of claim 17, wherein the incubation step occurs at a temperature in the range of about 100° F. to about 150° F.

20. The process for removing the peel from citrus fruit of claim 17, wherein the incubation step occurs at a temperature of about 122° F.

21. The process for removing the peel from citrus fruit of claim 1, further including the steps of:
    deactivating the enzyme by exposing the enzyme to a high temperature; and
    dividing the peeled fruit into segments.

22. The process for removing the peel from citrus fruit of claim 1, wherein the perforating step is performed mechanically.

23. The process for removing the peel from citrus fruit of claim 22, wherein the mechanical perforation is accomplished by advancing the fruit with a screw conveyor while supporting the fruit on a plurality of generally parallel rotating rods having perforation pins extending therefrom.

24. The process for removing the peel from citrus fruit of claim 1, wherein the enzyme solution includes a surface active agent.

25. The process for removing the peel from citrus fruit of claim 1, wherein the enzyme solution is used for at least one subsequent batch of citrus fruit.

26. The process for removing the peel from citrus fruit of claim 25, wherein the concentration of the enzyme solution is adjusted for each subsequent batch to have a predetermined value.

27. The process for removing the peel from citrus fruit of claim 26, wherein the adjustment step includes topping-up the enzyme solution with a predetermined amount of fresh enzyme solution.

28. The process for removing the peel from citrus fruit of claim 26, where in the adjustment step includes fortification of the enzyme solution with a predetermined amount of substantially pure enzyme.

29. The process for removing the peel of citrus fruit of claim 26 further including standardization of the enzyme by:
    comparing viscosity of a sample of the enzyme solution with viscosities of known concentrations of the enzyme solution to identify the enzyme concentration of the sample;
    determining the amount of pure enzyme to restore the nominal concentration of enzyme in the solution; and
    adding that amount of substantially pure enzyme to the enzyme solution.

* * * * *

UNITED STATES PATENT AND TRADEMARK OFFICE
CERTIFICATE OF CORRECTION

PATENT NO. : 7,629,011 B2
APPLICATION NO. : 11/207712
DATED : December 8, 2009
INVENTOR(S) : Jogre Suasin et al.

It is certified that error appears in the above-identified patent and that said Letters Patent is hereby corrected as shown below:

Title Page, Item (75), Inventors: correct the second inventor's name as follows:

to Karim NAFISI-MOVAGHAR

Signed and Sealed this

Sixteenth Day of February, 2010

David J. Kappos
*Director of the United States Patent and Trademark Office*